United States Patent
Corley et al.

(10) Patent No.: US 6,304,874 B1
(45) Date of Patent: *Oct. 16, 2001

(54) ACCESS SYSTEM FOR DISTRIBUTED STORAGE

(75) Inventors: Stephen Leslie Corley; Edward John Percival Hayes, both of Ipswich; Jonathan William Reed, Reading; Richard John Shortland, Felixstowe; Benjamin Roy Whittle, Woodbridge, all of (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,948
(22) PCT Filed: Jul. 8, 1997
(86) PCT No.: PCT/GB97/01828
  § 371 Date: Jun. 26, 1998
  § 102(e) Date: Jun. 26, 1998
(87) PCT Pub. No.: WO98/01809
  PCT Pub. Date: Jan. 15, 1998

(30) Foreign Application Priority Data

Jul. 9, 1996 (EP) .................................................. 96305063

(51) Int. Cl.[7] ...................................................... G06F 17/30
(52) U.S. Cl. .................................................. 707/10; 707/2
(58) Field of Search .............................. 707/1–4, 8, 203, 707/205

(56) References Cited

U.S. PATENT DOCUMENTS 5,606,693 * 2/1997 Nielson et al. ........................ 707/10
5,659,746 * 8/1997 Bankert et al. ...................... 707/205
5,717,914 * 2/1998 Husick et al. ........................... 707/5

(List continued on next page.)

FOREIGN PATENT DOCUMENTS 07 028846  1/1995 (JP) .
07 085102  3/1995 (JP) .
08 139747  5/1996 (JP) .

OTHER PUBLICATIONS

Wade et al "Single logical view over enterprise–wide distributed databases", ACM 1993, pp. 441–444.*

Krishna et al "Distributed indices for accessing distributed data", IEEE 1993, pp. 199–207.*

(List continued on next page.)

Primary Examiner—Thomas Black
Assistant Examiner—Uyen Le
(74) Attorney, Agent, or Firm—Nixon & Vanderhye P.C.

(57) ABSTRACT

In a brokering system for items of software or data, submission inputs are made to a database. Each submission input includes a descriptive data set in relation to a unit of data or software, together with an address field. The brokering system loads the submission input to the database and copies it to temporary stores identified in the address field. Each temporary data store is allocated to a respective index management interface and is viewable to that index management interface only. Inputs can be made at the index management interface to transfer the descriptive data sets received to an index accessible by a plurality of search interfaces, or simply to delete the descriptive data set from the temporary data store.

16 Claims, 4 Drawing Sheets

U.S. PATENT DOCUMENTS

| | | | | |
|---|---|---|---|---|
| 5,724,575 | * | 3/1998 | Hoover et al. | 707/10 |
| 5,787,295 | * | 7/1998 | Nakao | 707/500 |
| 5,799,184 | * | 8/1998 | Fulton et al. | 707/2 |
| 5,806,065 | * | 9/1998 | Lomet | 707/8 |
| 5,826,261 | * | 10/1998 | Spencer | 707/5 |
| 5,845,305 | * | 12/1998 | Kujiraoka | 707/532 |
| 5,852,821 | * | 12/1998 | Chen et al. | 707/2 |
| 5,924,090 | * | 7/1999 | Krellenstein | 707/5 |

OTHER PUBLICATIONS

McLeod et al "The design and experimental evaluation of an information discovery mechanism for networks of autonomous database systems", IEEE 1995, pp. 15–24.*

De Vries, "No time to WAISt, bringing local library friendliness to the Internet", $61^{st}$ IFLA General Conference, Istanbul, Turkey, Aug. 20–25, 1995, vol. 30, No. 1, INSPEL, 1996, Tech, Univ. Berlin for INSPEL, Germany, pp. 52–56.

* cited by examiner

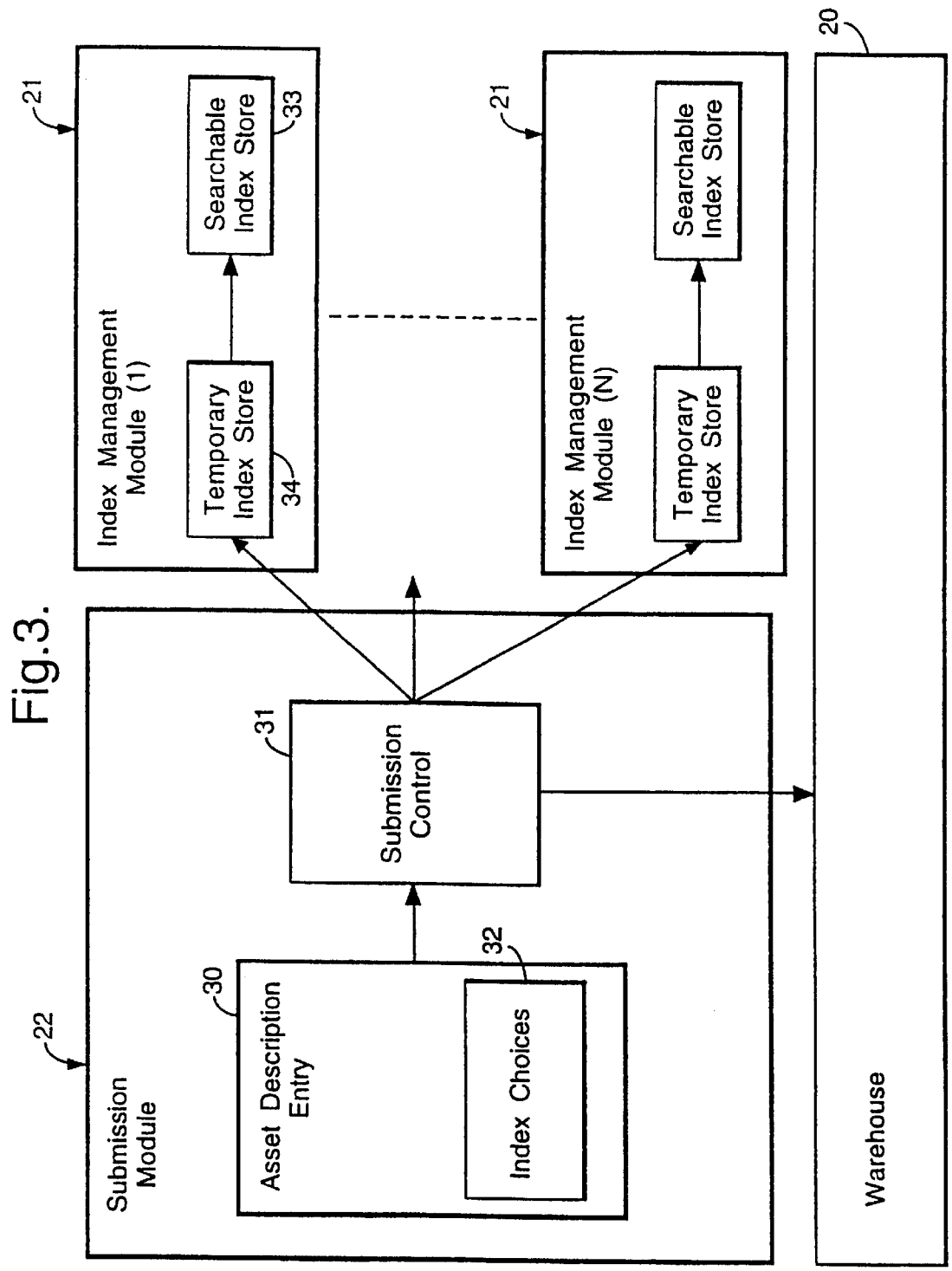

B. Index Management

ACCESS SYSTEM FOR DISTRIBUTED STORAGE

This application is a 371 of PCT/GB97/01828, filed Jul. 8, 1997.

BACKGROUND OF THE INVENTION

The present invention relates to accessing items stored in distributed storage. It finds particular application in the field of re-usable software units.

It is a known problem that information retrieval from distributed information stores can be difficult. In the case of data accessible over the WorldWide Web area of the Internet, for instance, several different approaches have evolved. For instance, extensive hierarchical directories have been developed and, alternatively, search engines are available which themselves visit sites on the Web and identify relevant pages by matching key word sets.

SUMMARY OF THE INVENTION

According to the present invention there is provided a system for accessing units of data or software in distributed storage, the system comprising:

(i) a warehousing database with an input for descriptive data sets related to individual units of data or software stored in the distributed storage;

(ii) a set of indexes for containing respective lists of data sets selected from the data sets which have been input to the database;

(iii) browsing means for browsing the indexes; and (iv) control means for controlling the contents of the set of indexes;

wherein each index has associated with it a data store to which selected data sets can be copied when input to the warehousing database and wherein each descriptive data set has associated with it an address data field, the system further comprising means to read the address data field associated with each descriptive data set, on input of the data set to the warehousing database, and means to route a copy of the data set to the data store(s) identified by the contents of said address data field.

Preferably, although all the indexes can be browsed by the browsing means, the control means is segregated into multiple control means, each control means having control of the contents of one or more indexes allocated from the set of indexes, independently of other indexes of the set. Each control means may then have access to the data store(s) associated with its respective index(es), but is barred from accessing others of the data stores.

Preferably, each control means provides control over the contents of its allocated indexes by transfer of one or more selected data sets from the associated temporary data store into the index.

Embodiments of the present invention offer a way of managing and accessing data, or software, which is particularly suited to the re-use of units of software, for instance in the building of standardlised strategic architectures. For instance, the units of software might be modules for building operating support systems in a telecommunications environment. The units of data or software might include designs, requirements, test scripts and code developed by any of a plurality of different entities, either belonging to the same overall body, such as one company, or belonging to several different overall bodies, such as partners in collaboration.

The idea of the re-use of modules of software is known but the realities of developing the re-usable software and subsequently re-using it have presented both technical and non-technical challenges. There have been initiatives in the past which have tried to overcome the problems, for instance by building libraries. These have not, however, been successful. As soon as the library becomes large, locating information or software modules again becomes a problem.

Embodiments of the present invention can provide flexibility and scaleability in a distributed "library" while maintaining simple access capability. It provides a physical framework for a "shopping mall" approach in which the prospective re-user does not browse the main repository, the warehousing database, but browses indexes whose contents are individually controlled by brokers, or "Shopkeepers". By building in segregational control over the contents of the indexes, each index can be allocated to a "Shopkeeper" who uses the index in the manner of a shop window, to show data sets of a common type. For instance, one index may cover software units in a particular language while another relates to billing functionality.

The addition of an address data field to each descriptive data set allows the supplier ("Submitter") of the unit of software or data which is to go into the warehousing database to alert the shopkeepers controlling the indexes they think most relevant and to give those shopkeepers the immediate means to load data sets to their particular index. This is done by the provision of the data stores associated with each index, which data store can be viewed by the shopkeeper but not by the means for browsing the indexes, and therefore not by the searchers. By using the address data field, the Submitter ensures their descriptive data set will be copied into the data store for the index(es) they think most relevant. It is this which alerts the shopkeeper and enables loading of the data set to the index.

BRIEF DESCRIPTION OF THE DRAWINGS

An embodiment of the present invention, known as the "Asset Broker", will now be described, by way of example only, with reference to the accompanying figures in which:

FIG. 3 shows, in a functional block diagram, the units within the components of FIG. 2;

DETAILED DESCRIPTION

Figure 1:
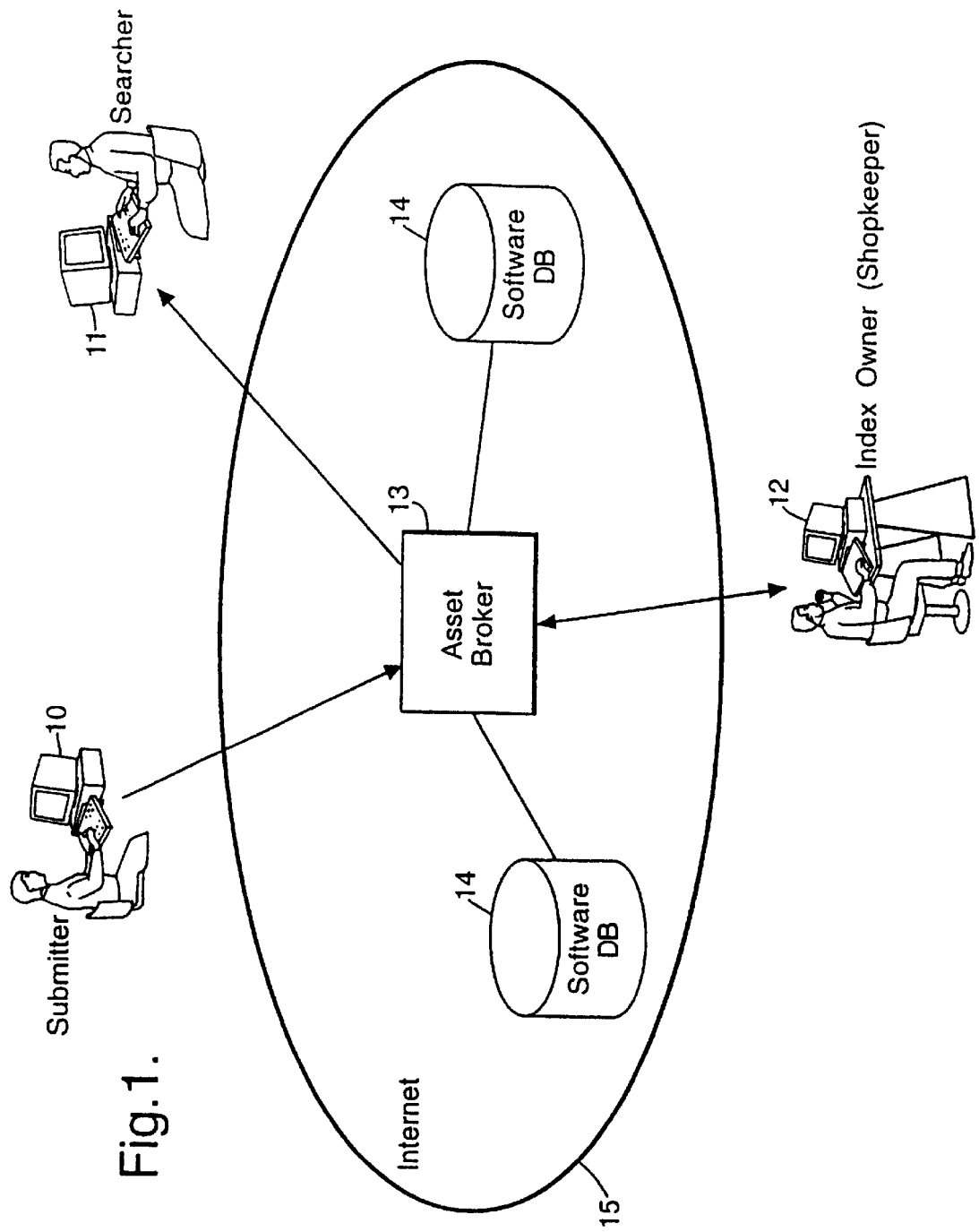
FIG. 1 shows the overall context for the Asset Broker.

Referring to FIG. 1, the Asset Broker provides a management and control structure 13 between an interface 10 for input of descriptive data sets related to units of software (or data) and an interface 1 for output of those descriptive data sets to a potential user of the units of software to which the data sets relate. This management and control structure 13 provides sorting and access mechanisms, and a control interface 12 for a third type of user, herein referred to as the "Index Owner" or "Shopkeeper". The descriptive data sets themselves sit in a warehousing database within the Asset Broker system 13, and also in one or more selected data stores allocated to "Index Owners". These selected data stores may be physically located anywhere, for instance in the Asset Broker 13 or at the relevant Index Owners' interfaces 12.

The units of software to which the descriptive data sets relate are stored in a distributed database 14.

Communications between the interfaces 10, 11, 12, the Asset Broker 13 and locations in the distributed database 14 are provided by means of the Internet 15 in known manner.

Figure 2:
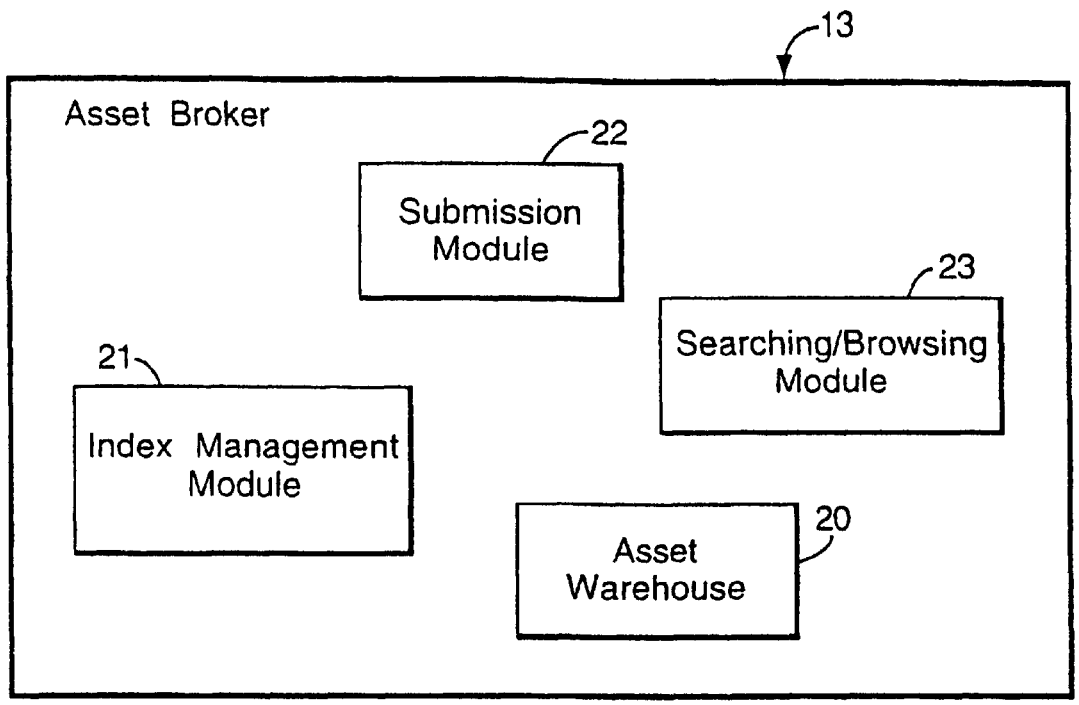
FIG. 2 shows primary components of the Asset Broker structure.

Referring to FIG. 2, the structure of the Asset Broker 13 is the warehousing database 20, together with three management and control modules. These modules comprise an index management module 21, a submission module 22 and and a searching/browsing module 23. It is broadly these modules 21, 22, 23 which provide the relevant functionality at the interfaces 10, 11, 12.

The overall functions of the Asset Broker 13 are:

i) to receive at the submission module 22 data sets describing modules of software from, for instance, a software developer, the "Submitter";

ii) to store those descriptive data sets in the warehousing database 20;

iii) to offer via the index management module 21 selected descriptive data sets to particular Index Owners by loading them to a temporary data store visible to the particular index Owner; and iv) to provide searching and browsing facilities, by means of the searching and browsing module 23, of the indexes, the temporary data stores and the warehousing database 20 to various categories of user at the different interfaces 10, 11, 12.

In practice, the developer of a new module of software, the Submitter, offers a descriptive data set, by means of a Submitter's interface 10, to the Asset Broker 13. An additional data field associated with, or embedded in, the data set, is used by the Submitter to provide an identifier, or address, for each viewable index or its associated temporary data store that the Submitter intends the data set to go to. The Asset Broker 13 loads the descriptive data set to its warehouse database, and reads the additional data field. This triggers an alert to selected Index Owners because the Asset Broker 13 then loads a copy of the descriptive set to a temporary data store 14 dedicated to the selected Index Owner.

The Index Owner makes a decision whether to accept the descriptive data set in their allocated Index, this being viewable by any of multiple Searchers, or indeed other entities which may alternatively be machine-embodied. The Index Owner can then make a control input to load the descriptive data sets to an index visible to a "Searcher" interface, or to delete the data set from the temporary data store as the case may be. The Asset Broker 13 responds to a "load" input from an Index Owner by transferring the relevant descriptive data set to a viewable index, available at any Searcher interface.

The overall scheme is that each Index Owner will reflect selected interests in their index, in the manner of an individual shop in a shopping mall. For instance, one Index may relate to C++ developments while another is relevant to Integrated Services Digital Network (ISDN). A Searcher, looking to find a module of software to meet a particular requirement will select an Index to view for descriptive data sets relating to modules to suit their particular purpose. If a descriptive data set is present in the index viewed, the Searcher can access the module of software itself by requesting the Asset Broker 13 to deliver the module, by any suitable route but conveniently by the route used originally for the descriptive data set.

Figure 6:
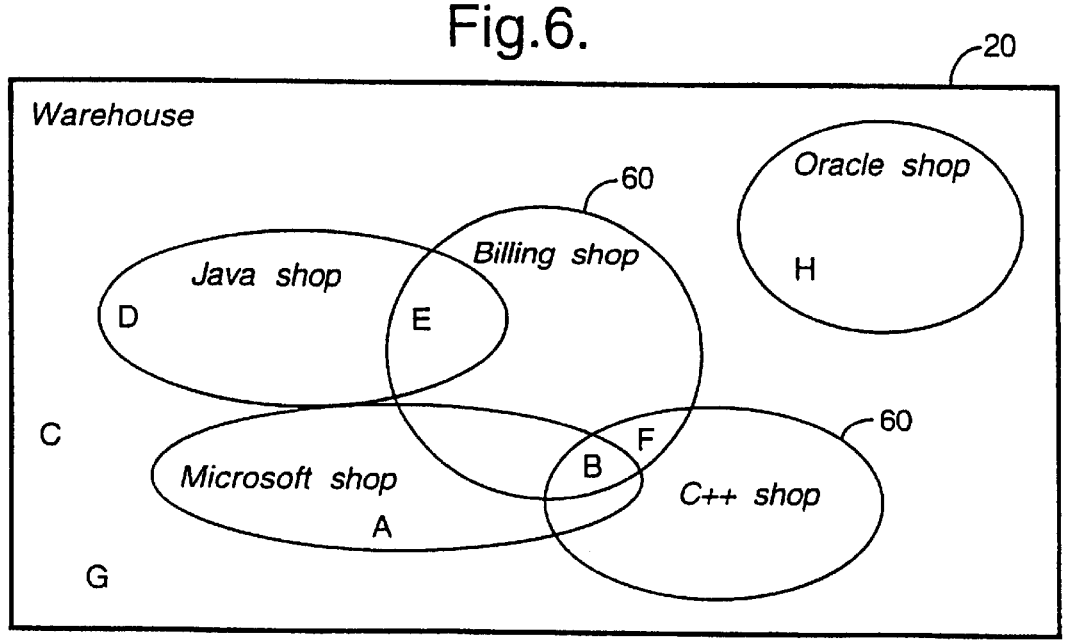
FIG. 6 shows a schematic representation of data stored in a warehousing database of the Asset Broker.

Referring to FIGS. 3 and 6, the warehouse database 20 contains all the descriptive data sets input at a submitter interface 10. In FIG. 6, each descriptive data set is labelled with a capital letter, A–H. The data sets are allocated to different index/temporary data store areas 60. It can be seen that one descriptive data set, for instance, B, E and F, can be allocated to more than one index/data store area 60. Conversely, some of the descriptive data sets, C and G, have not been loaded in any index or temporary data store area 60. This may be because a shopkeeper rejected the descriptive data sets when offered by the relevant temporary data store, or it may be that the submitter did not use the address data field associated with the descriptive data set.

Although the indexes have been described above in terms of a single index associated with a single temporary data store, the index may in practice be subdivided, for instance, so as to categorise data sets viewable within one index. For instance, the sub-division could provide a functional breakdown, for example string manipulation or particular mathematical functions.

The temporary data store associated with an index for a particular shopkeeper may be used in ways additional to that described above. Although it can be used to store descriptive data sets newly submitted to the warehousing database 20, it may also be used by the relevant shopkeeper to hold descriptive data sets withdrawn from the viewable index, and to store incoming updates on existing data sets already in the viewable index Shopkeepers may browse the warehousing database 20 to select from recently submitted descriptive data sets. For this purpose, it may be preferable that an area of the warehousing database 20 is set aside for storing copies of all new submissions.

It is not essential, as will be understood, that the "submitters" should be people. It may be that a submission interface 10 provides an interface to an existing software unit library, separate from the warehousing database 20, or to, for instance, an object design catalogue.

Referring to FIG. 3, the submission module 22 of the Asset Broker comprises means for reading the address data field in a descriptive data set submitted to the Asset Broker 13. This reading means 30 is coupled to a submission control unit 31 which acts on the data contained in the address data field 32 to load the descriptive data set appropriately. This might be to output the descriptive data set to one or more of the index management modules 21, in addition to the warehousing database 20.

An index management module 21 is provided for each of the index/temporary data store areas. On receiving a descriptive data set from the submission control unit 31 of the submission module 22, the index management module 21 loads the data set to the temporary data store 34. The index management module 21 will then await a control input by a shopkeeper user, at a shopkeeper interface 12, before transferring a descriptive data set appropriately. This may be to a reuseable index 33 or may simply be to delete the descriptive data set from the temporary data store 34.

Figure 4:
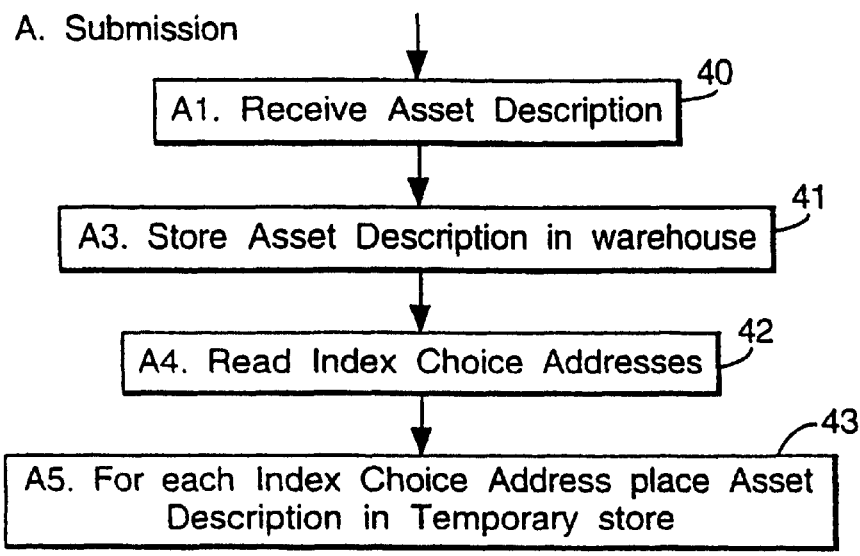
FIG. 4 shows a flow diagram of the steps involved in loading a module of data or software to the system of FIG. 1.

Referring to FIG. 4, a flow diagram for the submission routine can be described as follows. The submission routine is triggered by input of a descriptive data set 30 via a submission interface 10 (STEP 40). The submission module 22 stores the descriptive data set in the warehouse database 20 (STEP 41) and reads the address data field embedded in, or associated with, the descriptive data set 30 (STEP 42). The submission module 22 then loads the descriptive data set to the temporary data stores 34 associated with the browsable indexes 33 identified at the address data field 32 (STEP 43).

Figure 5:
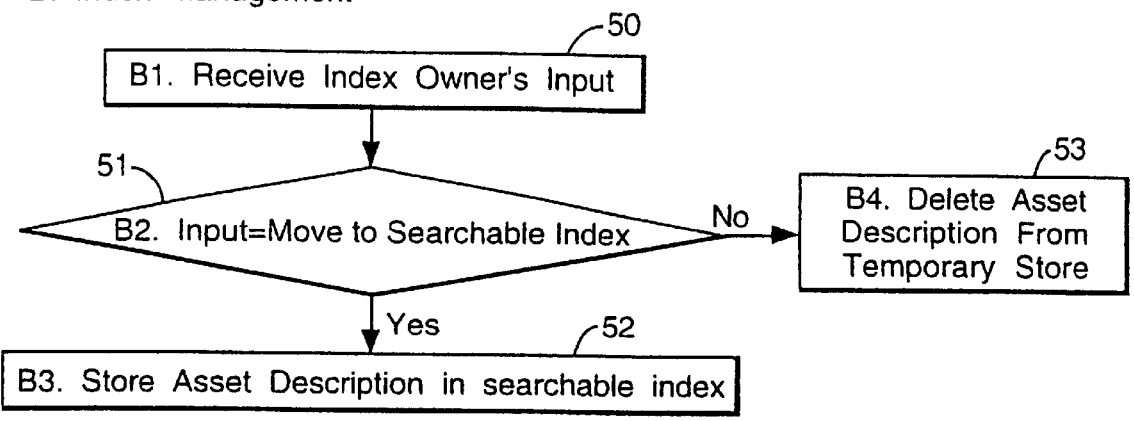
FIG. 5 shows a flow diagram of the steps involved in providing modules for access.

Referring to FIG. 5, the index management modules 21 are passive with regard to receiving data sets from a submission control unit 31 of the submission module 22 in the Asset Broker 13. However, the index management module 21 will be triggered by receipt of a shopkeeper's input at a shopkeeper's interface 12 (STEP 50). The index management module 21 has two modes of response to the index owner's (shopkeeper's) input: to delete the descriptive data set from the temporary data store 34 or to load the descriptive data set in the browsabie index 33 (STEPS 51, 52 53).

Further functionality which might be provided in an embodiment of the present invention is the provision of management data for instance to the submitters at a submitter interface 10. The descriptive data sets may well relate to such things as software modules which have a rich set of attributes, such as operating systems, signs, quality status, user comments and relationships with other software modules. The asset broker can provide data to the submitters which allow the submitters to modify their mode of data set submission. For instance, by providing management information such as how many people have accessed a descriptive data set, the submitters are potentially aided in modifying data set content.

Each of the interfaces 10, 11, 12 may require log-on procedures. This enables a level of quality assurance to be put in place. It is probably effectively essential in the case of the shopkeeper interface 12 if each shopkeeper is only to be given control access to their own index management functionality and temporary data store 21, 34.

Additional, very useful management functionality of the asset broker may be the provision of "hooks" for costs and licences to support processes for charging for software modules, or the like, to which the descriptive data sets relate.

Although as described the warehousing database 20 is located centrally, it will be recognised that the warehousing database 20 could also be distributed, or federated, with local "libraries" providing the entry point for submitters or searchers to a network of peer databases.

It will be recognised also that, although described in the context of an Internet communications environment, other networks could be used to carry communications between the interfaces 10, 11, 12 and the Asset Broker 13. However, the Internet environment provides a convenient means for not just the communications but also downloading software modules to which the descriptive data sets relate, for instance by File Transfer Protocol (FTP). The route established for loading the descriptive data sets to the indexes can equally be used to download the actual software units from the distributed database 14.

The indexes can be browsed by the searchers using keyword searching. Similarly, the warehousing database 20 can be browsed by the shopkeepers, using keyword searching, in order for instance to populate new subdivisions of their respective indexes. Although the Asset Broker 13 provides a powerful means for providing access to a large number of software or data units, provided by a variety of sources, selection of the correct software data units using keyword sets is very dependent on the keywords chosen by the entity carrying out a search, or browsing. Other techniques could be used instead or as well as keyword searching, such as Case Based Reasoning (CBR).

CBR is a known technique which could be used to provide a further level of automation to re-use of software or data via the Asset Broker 13.

What is claimed is:

1. Apparatus for providing indexes for units of data or software in distributed storage, the apparatus comprising:
   (i) a database with an input for descriptive data sets related to individual units of data or software stored in the distributed storage;
   (ii) a set of indexes for containing respective lists of descriptive data sets selected from the descriptive data sets which have been input to the database; and
   (iii) control means for controlling the contents of the set of indexes;
   wherein each index has associated with it a data store to which selected descriptive data sets can be copied when input to the database, wherein each descriptive data set has associated with it an address data field, the apparatus further comprising means to read the address data field associated with each descriptive data set, on input of the descriptive data set to the database, means to route a copy of the descriptive data set to the data store(s) identified by the contents of its address data field, and means for transferring selected descriptive data sets from the data stores to the associated indexes, and wherein the means for transferring selected descriptive data sets is operable in response to an indication of acceptance from a user interface.

2. Apparatus according to claim 1 wherein the control means provides multiple control means, each of the multiple control means providing control of the contents of one or more indexes allocated from the set of indexes, independently of other indexes of the set.

3. Apparatus according to claim 2 wherein each of the multiple control means is provided with independent access authorisation means such that each control means can be dedicated to a respective authorised user.

4. A method for providing searchable indexes for units of data or software in a distributed database, the method comprising the steps of:
   receiving a descriptive data set related to an individual unit of software or data stored in the distributed database, the descriptive data set having an associated or embedded address field identifying one or more index management modules, each index management module comprising a temporary data store and a searchable index store;
   storing the received descriptive data set in a descriptive data set database;
   reading the address field associated with or embedded in the descriptive data set;
   outputting the descriptive data set to the temporary data store of each index management module identified in the address field; and
   receiving inputs for each index management module, the inputs including indications of rejection for deleting descriptive data sets from the corresponding temporary data store and indications of acceptance for transferring descriptive data sets from the corresponding temporary data store to the corresponding searchable index store.

5. Apparatus according to claim 1 wherein the control means provides deletion of one or more selected descriptive data sets from a temporary data store, in response to a control input at a user interface.

6. Apparatus according to claim 2 wherein the control means provides respective access criteria to each of the data stores, such that access to each data store can be controlled by a unique access criterion, and provides a different access procedure to the browsing means for browsing the set of indexes, the access procedure for browsing the indexes being common to the indexes in the set.

7. Apparatus according to claim 1 in which one or more of said set of indexes are arranged to comprise subcategorizations of respective lists of said selected descriptive data sets.

8. Apparatus according to claim 1 in which the individual units of data or software are stored in a non-distributed storage system.

9. Apparatus according to claim 1 further comprising interface means for interfacing with other systems such as charging, pricing or license processing systems.

10. A method for providing indexes for units of data or software in distributed storage, the method comprising the steps of:

(i) inputting into a database descriptive data sets related to individual units of the data or software stored in the distributed storage, each descriptive data set being associated with an address data field;

(ii) building a set of indexes for containing respective lists of descriptive data sets selected from the descriptive data sets that have been input to the database, each index having an associated data store and being associated with an address;

(iii) reading the address data field associated with each descriptive data set input to the database and, in accordance with the address data, sending a copy of the associated descriptive data set to each data store identified by the contents of said address data field, and (iv) transferring descriptive data sets from the data stores to the indexes in response to inputs indicating acceptance from users.

11. A computer-readable medium having computer-executable instructions for performing the method recited in claim 4.

12. A method according to claim 10 further comprising deleting one or more selected descriptive data sets from a temporary data store, in response to inputs from a user.

13. A method according to claim 10 in which one or more of said indexes are arranged to comprise sub-categorizations of respective lists of said selected descriptive data sets.

14. A method according to claim 10 in which the individual units of data or software are stored in a non-distributed storage system.

15. Apparatus for providing searchable indexes for data or software stored in a distributed database, the apparatus comprising:

index management modules each comprising a temporary index store and a searchable index store; and a submission module for receiving a descriptive data set related to an individual unit of software or data stored in the distributed database, the descriptive data set having an associated or embedded address field identifying one or more of said index management modules, wherein said submission module stores the received descriptive data set in a descriptive data set database, reads the address field associated with or embedded in the descriptive data set, and outputs the descriptive data set to the temporary data store of each index management module identified in the address field, and each said index management module is responsive to an indication of rejection by an index management module user for deleting the descriptive data set in its temporary data store and to an indication of acceptance by the index management module user for transferring the descriptive data set from its temporary data store to its searchable index store.

16. An apparatus according to claim 15, wherein the searchable index stores are searchable using an Internet browser.

* * * * *